US010480581B2

(12) United States Patent
Hansen et al.

(10) Patent No.: US 10,480,581 B2
(45) Date of Patent: Nov. 19, 2019

(54) ELECTRO-CHEMICAL HARDENING OF BEARING RACEWAYS

(71) Applicant: Sikorsky Aircraft Corporation, Stratford, CT (US)

(72) Inventors: Bruce D. Hansen, Shelton, CT (US); William P. Fallon, Jr., Wallingford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/953,025

(22) Filed: Apr. 13, 2018

(65) Prior Publication Data

US 2018/0347630 A1   Dec. 6, 2018

Related U.S. Application Data

(60) Provisional application No. 62/515,900, filed on Jun. 6, 2017.

(51) Int. Cl.
| | |
|---|---|
| *F16C 33/62* | (2006.01) |
| *F16C 33/64* | (2006.01) |
| *F16C 19/16* | (2006.01) |
| *C25D 11/02* | (2006.01) |

(Continued)

(52) U.S. Cl.
CPC ............ *F16C 33/62* (2013.01); *C25D 11/022* (2013.01); *C25D 11/024* (2013.01); *C25D 11/026* (2013.01); *F16C 19/06* (2013.01); *F16C 19/16* (2013.01); *F16C 33/303* (2013.01); *F16C 33/64* (2013.01); *F16C 2202/04* (2013.01); *F16C 2206/40* (2013.01); *F16C 2223/10* (2013.01); *F16C 2240/60* (2013.01); *F16C 2361/65* (2013.01)

(58) Field of Classification Search
CPC .......... F16C 19/06; F16C 19/16; F16C 33/62; F16C 33/64; F16C 2206/40; F16C 2206/42; F16C 2206/44; F16C 2206/48; F16C 2206/56; F16C 2206/58; F16C 2206/60; C25D 11/022; C25D 11/024; C25D 11/026; Y10T 29/49689

See application file for complete search history.

(56) References Cited

U.S. PATENT DOCUMENTS

| | | | | |
|---|---|---|---|---|
| 5,593,234 A | * | 1/1997 | Liston | ..................... C23C 28/00 384/492 |
| 5,971,620 A | * | 10/1999 | Gabelli | ................... F16C 33/32 384/491 |
| 6,334,713 B1 | | 1/2002 | Chu | |

(Continued)

FOREIGN PATENT DOCUMENTS

JP            H04228921 A        8/1992

*Primary Examiner* — Phillip A Johnson
(74) *Attorney, Agent, or Firm* — Cantor Colburn LLP

(57) ABSTRACT

A method of making bearings includes treating a metallic surface of a bearing raceway with a pulsed electrochemical processing nozzle to transform the amorphous oxide into a crystalline structure on the metallic surface electro-chemically and convert the metallic surface into a ceramic like hardness surface. Treating the metallic surface can include forming a gradient in material composition transitioning from a purely metallic material at a cross-sectional position within the bearing raceway to a purely crystalline structure material at the ceramic like hardness surface of the bearing raceway.

7 Claims, 1 Drawing Sheet

(51) Int. Cl.
    *F16C 19/06*     (2006.01)
    *F16C 33/30*     (2006.01)

(56) References Cited

U.S. PATENT DOCUMENTS

| | | |
|---|---|---|
| 6,746,156 B2 | 6/2004 | Giesler et al. |
| 8,210,751 B2 * | 7/2012 | Streit .................. F16C 33/62 |
| | | 384/492 |
| 2011/0274382 A1 | 11/2011 | Berns et al. |

* cited by examiner

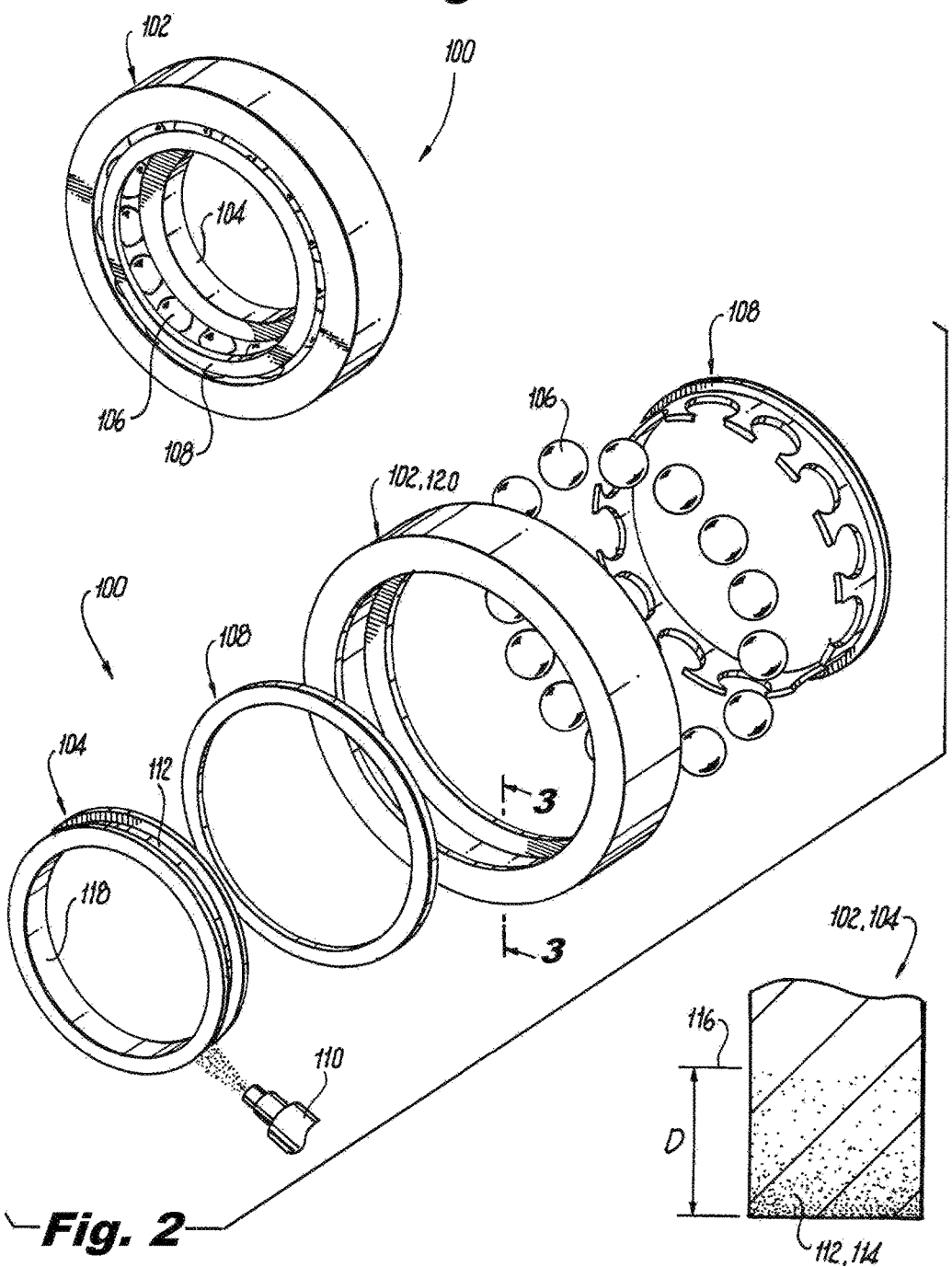
Fig. 1
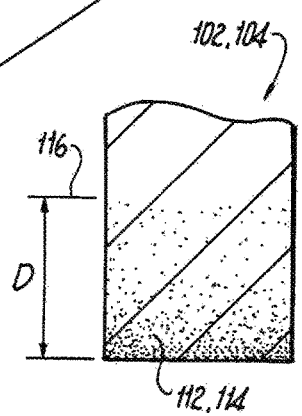
Fig. 2
Fig. 3

ELECTRO-CHEMICAL HARDENING OF BEARING RACEWAYS

CROSS-REFERENCE TO RELATED APPLICATIONS

This application claims the benefit of U.S. Provisional Application Ser. No. 62/515,900, filed Jun. 6, 2017, which is incorporated herein by reference in its entirety.

BACKGROUND

Field of the Invention

The present disclosure relates to bearings, and more particularly to use of electro-chemical hardening of bearing raceways such as in aerospace applications.

Description of Related Art

Most bearings have steel outer and inner raceways, and steel rolling elements. Ceramics have been introduced into bearings for improving life with the harder ceramic material. Hybrid bearings have rolling elements which are ceramic and the raceways are steel, which when designed properly will allow the steel raceway to deform and achieve full contact on the rolling element. However the life of the bearing is limited to the life of the raceway.

The conventional techniques have been considered satisfactory for their intended purpose. However, there is an ever present need for improved bearings. This disclosure provides a solution for this need.

SUMMARY OF THE INVENTION

A method of making bearings includes treating a metallic surface of a bearing raceway with a pulsed electrochemical processing nozzle to transform the amorphous oxide into a crystalline structure on the metallic surface electro-chemically and convert the metallic surface hardness to an equivalent of diamond like or ceramic like hardness.

Treating the metallic surface can include forming a gradient in material composition transitioning from a purely metallic material at a cross-sectional position within the bearing raceway to a purely ceramic like hardness crystalline structure material at the surface of the bearing raceway. A gradient depth can be defined from the cross-sectional position where the gradient in material composition is a purely metallic material, to the purely ceramic like hardness crystalline structure surface, wherein the gradient depth is within a range up to 300 microns. Converting the metallic surface into a ceramic like hardness crystalline structure surface can include hardening the metallic surface into a ceramic like hardness crystalline structure surface with a hardness greater than or equal to a hardness of 80 on the Rockwell hardness scale.

The bearing raceway can be an inner bearing raceway, wherein treating the metallic surface of the bearing raceway includes treating a radially outward facing metallic surface of the inner raceway, and leaving a radially inward facing metallic surface of the inner raceway metallic. The method can include treating a metallic surface of an outer bearing raceway with an electro-chemical processing nozzle to transform the amorphous oxide into a crystalline structure on the metallic surface of the outer bearing raceway electro-chemically to convert the metallic surface hardness to an equivalent of diamond like or ceramic like hardness, wherein treating the metallic surface of the outer bearing raceway includes treating a radially inward facing metallic surface of the outer raceway, and leaving a radially outward facing metallic surface of the outer raceway metallic. The method can include assembling the inner and outer bearing raceways together with a plurality of ceramic rolling elements therebetween.

A bearing can be produced by processes as described above. For example, with an inner bearing race and outer bearing race as described above assembled together with a plurality of ceramic rolling elements therebetween, the ceramic rolling elements can contact the inner and outer bearing races only on the ceramic like hardness crystalline structure surfaces thereof.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a bearing constructed in accordance with the present disclosure, showing the inner and outer bearing raceways;

FIG. 2 is an exploded perspective view of the bearing of FIG. 1, showing the treated surfaces of the inner and outer bearing races; and FIG. 3 is a schematic cross-sectional elevation view of a portion of a bearing race of FIG. 1, showing the material gradient transitioning from purely metallic to purely ceramic like hardness crystalline structure at the surface.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a bearing in accordance with the disclosure is shown in FIG. 1 and is designated generally by reference character 100. Other embodiments of bearings in accordance with the disclosure, or aspects thereof, are provided in FIGS. 2-3, as will be described. The systems and methods described herein can be used to improve surface hardness on bearing surfaces, while maintaining the ductility afforded by metallic materials underling the hardened surfaces.

Bearing 100 includes an outer bearing raceway 102 assembled together with an inner bearing raceway 104 with a plurality of ceramic rolling elements 106 therebetween for relative rotational movement of the outer and inner bearing raceways 102 and 104. A cage 108 is also assembled onto the ceramic rolling elements 106 to maintain the ceramic rolling elements 106 in position. In FIG. 2, the cage 108 is shown split apart for sake of clarity.

A method of making bearings such as bearing 100 includes treating an initially metallic surface of a bearing raceway, e.g., bearing raceway 102 or 104, with a pulsed electrochemical processing nozzle, e.g. nozzle 110 shown in FIG. 2, to transform the amorphous oxide into a crystalline structure on the metallic surface electro-chemically and convert the metallic surface, which initially had a metallic surface hardness, to have a diamond like or ceramic like hardness crystalline structure surface.

In FIG. 2, nozzle 110 is schematically shown electro-chemically processing the radially outer surface 112 of inner bearing raceway 104, which is initially a metallic surface, into a ceramic like hardness crystalline structure surface. This leaves a radially inward facing metallic surface 118 of the inner raceway 104 metallic. Similarly, the method can include treating a metallic, radially inward facing surface 114 of the outer bearing raceway 102 with the electro-chemical processing nozzle 110 to transform the amorphous oxide into a crystalline structure on the initially metallic surface 114 of the outer bearing raceway electro-chemically to convert the initially metallic surface 114 into a ceramic like hardness crystalline structure surface, and leaving a radially outward facing metallic surface 120 of the outer raceway 102 metallic. After the surfaces 112 and 114 have been treated as described above, the inner and outer bearing raceways 102 and 104 can be assembled together with the plurality of ceramic rolling elements 106 therebetween to form a functional bearing 100. The ceramic rolling elements 106 can advantageously contact the inner and outer bearing races only on the ceramic like hardness crystalline structure surfaces 112 and 114 thereof.

With reference to FIG. 3, treating the metallic surface includes forming a gradient in material composition transitioning from a purely metallic material at a cross-sectional position 116 within the bearing raceway 102 or 104 to a purely ceramic like hardness crystalline structure material at the surface 112 or 114 of the bearing raceway 102 or 104, respectively. A gradient depth D can be defined from the cross-sectional position 116 where the gradient in material composition is a purely metallic material, to the purely ceramic like hardness crystalline structure surface 112 or 114, wherein the gradient depth D is within a range of up to 300 microns. Converting the metallic surface into a ceramic like hardness crystalline structure surface can include hardening the metallic surface into a ceramic like hardness crystalline structure surface with a resulting hardness greater than or equal to a hardness of 80 on the Rockwell hardness scale. Examples of metallic materials that can be used for raceways 102 and 104 include but are not limited to M50, M50NIL, AISI 4320, AISI 4620, SAE 9310, SAE 52100, SAE 8620, Cronidor, CSS 42L, and the like. The ceramic like hardness crystalline structure material can be or can be like silicon nitride $Si_3N_4$, for example.

During the process of transforming the metallic material to a ceramic like hardness material, the following can be used to determine when the process is complete. After setting up the chemical hardening process, the conversion of metal to metal oxide can begin. Plasma transforms amorphous oxide into a crystalline structure. Then a test can be performed to determine whether power supplied results in continuous growth into the metallic material. If yes, then the process of converting metal to metal oxide, plasma transforming the amorphous oxide, and testing if the power supplied results in continuous growth can be continued. Once the power supplied does not result in continuous growth into the metallic material, the process is complete.

Processes as described herein provide a metal and transforms the amorphous oxide into a crystalline structure on the surface that has the properties of ceramic like hardness, e.g., high surface hardness, but the flexibility or ductility/elasticity of metal. Using such surface crystalline structure with ceramic like hardness on metallic bearing raceways can extend the life of a bearing with beyond that of conventional hybrid ceramic/metallic bearings. Bearings with surface crystalline structure with ceramic like hardness and metallic raceways combined with ceramic rolling elements as disclosed herein can improve the bearing loading and/or reduce the overall bearing size relative to conventional bearings. This can have a considerable impact in gearbox design configurations that have a pinion bearing that is highly loaded, but is restricted in size to avoid interference with the mating gear, for example. With surface crystalline structure with ceramic like hardness and metallic raceways, bearings can be designed with unlimited or improved life compared to traditional techniques.

The methods and systems of the present disclosure, as described above and shown in the drawings, provide for bearings with superior properties including improved surface hardness and mechanical flexibility for improved life relative to conventional bearings. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of making bearings comprising a bearing raceway rotatably housing a plurality of ceramic rolling elements, the method comprising:
   treating a metallic surface of the bearing raceway with a pulsed electrochemical processing nozzle to transform amorphous oxide into a crystalline structure on the metallic surface electro-chemically and convert the metallic surface into a ceramic like hardness crystalline structure surface.

2. The method as recited in claim 1, wherein treating the metallic surface includes forming a gradient in material composition transitioning from a purely metallic material at a cross-sectional position within the bearing raceway to a purely ceramic like hardness crystalline structure material at the surface of the bearing raceway.

3. The method as recited in claim 2, wherein a gradient depth is defined from the cross-sectional position where the gradient in material composition is a purely metallic material, to the purely ceramic like hardness crystalline structure surface, wherein the gradient depth is within a range up to 300 microns.

4. The method as recited in claim 1, wherein treating the metallic surface of the bearing raceway includes treating a radially outward facing metallic surface of an inner raceway, and leaving a radially inward facing metallic surface of the inner raceway metallic.

5. The method as recited in claim 1, wherein treating the metallic surface of the bearing raceway includes treating a radially inward facing metallic surface of an outer raceway, and leaving a radially outward facing metallic surface of the inner raceway metallic.

6. The method as recited in claim 1, wherein the bearing raceway is an inner bearing raceway, wherein treating the metallic surface of the bearing raceway includes treating a radially outward facing metallic surface of the inner raceway, and leaving a radially inward facing metallic surface of the inner raceway metallic, and further comprising:
   treating a metallic surface of an outer bearing raceway with an electro-chemical processing nozzle to transform amorphous oxide into a crystalline structure on the metallic surface of the outer bearing raceway electro-chemically to convert the metallic surface into a ceramic like hardness crystalline structure surface, wherein treating the metallic surface of the outer bearing raceway includes treating a radially inward facing metallic surface of the outer raceway, and leaving a radially outward facing metallic surface of the inner raceway metallic; and assembling the inner and outer bearing raceways together with a plurality of ceramic rolling elements therebetween.

7. The method as recited in claim 1, wherein converting the metallic surface into a ceramic like hardness crystalline structure surface includes hardening the metallic surface into a ceramic like hardness crystalline structure surface with a hardness greater than or equal to a hardness of 80 on the Rockwell hardness scale.

* * * * *